US012000251B2

(12) United States Patent
Rother et al.

(10) Patent No.: US 12,000,251 B2
(45) Date of Patent: Jun. 4, 2024

(54) FRACTURING PUMPS

(71) Applicant: STEWART & STEVENSON LLC, Houston, TX (US)

(72) Inventors: Jeff Rother, Oklahoma City, OK (US); Brent Finley, Oklahoma City, OK (US)

(73) Assignee: STEWART & STEVENSON LLC, Houston, TX (US)

( * ) Notice: Subject to any disclaimer, the term of this patent is extended or adjusted under 35 U.S.C. 154(b) by 380 days.

(21) Appl. No.: 17/345,995

(22) Filed: Jun. 11, 2021

(65) Prior Publication Data

US 2021/0396120 A1 Dec. 23, 2021

Related U.S. Application Data

(60) Provisional application No. 63/042,055, filed on Jun. 22, 2020.

(51) Int. Cl.

| | |
|---|---|
| ***E21B 43/26*** | (2006.01) |
| ***F04B 17/03*** | (2006.01) |
| ***F04B 17/05*** | (2006.01) |
| ***F04B 17/06*** | (2006.01) |
| ***F04B 49/06*** | (2006.01) |
| ***F04B 53/08*** | (2006.01) |
| ***F04B 53/18*** | (2006.01) |
| *F02B 63/04* | (2006.01) |

(52) U.S. Cl.

CPC .......... *E21B 43/2607* (2020.05); *F04B 17/03* (2013.01); *F04B 17/05* (2013.01); *F04B 17/06* (2013.01); *F04B 49/065* (2013.01); *F04B 53/08* (2013.01); *F04B 53/18* (2013.01); *F02B 63/047* (2013.01); *F04B 2205/09* (2013.01)

(58) Field of Classification Search

CPC .... E21B 43/2607; E21B 43/26; E21B 43/267; F04B 17/03; F04B 17/06; F04B 47/02; F04B 53/08; F04B 1/0538; F04B 49/06; F04B 53/16; F04B 9/04; F04B 9/045; F04B 17/05; F04B 2205/09; F04B 49/065; F04B 53/18; F04B 9/10

See application file for complete search history.

(56) References Cited

U.S. PATENT DOCUMENTS

| | | | |
|---|---|---|---|
| 3,789,601 | A | 2/1974 | Bergey et al. |
| 4,127,300 | A | 11/1978 | Melley et al. |
| 7,552,903 | B2 | 6/2009 | Dunn et al. |

(Continued)

*Primary Examiner* — Santosh R Poudel

(74) *Attorney, Agent, or Firm* — Ewing & Jones, PLLC

(57) ABSTRACT

A frac system includes an engine, the engine having a crankshaft and a radiator. The radiator includes a radiator cooling fan. The frac system also includes a transmission coupled to the engine and a frac pump coupled to the transmission, the frac pump including a frac pump lubricating oil pump. The frac system further includes a traction drive motor system. The traction drive motor system includes a first set of traction drive motors, the first set of traction drive motors mechanically connected to the crankshaft. The traction drive motor system also includes a second set of traction drive motors, the second set of traction drive motors mechanically connected to the radiator cooling fan. In addition, the traction drive motor system includes third set of traction drive motors, the third set of traction drive motors mechanically connected to the frac pump lubricating oil pump.

8 Claims, 2 Drawing Sheets

(56) References Cited

U.S. PATENT DOCUMENTS

| | | | | |
|---|---|---|---|---|
| 8,607,930 | B2 | 12/2013 | Stewart | |
| 9,410,410 | B2 | 8/2016 | Broussard et al. | |
| 9,650,879 | B2 | 5/2017 | Broussard et al. | |
| 9,745,840 | B2 * | 8/2017 | Oehring | F02C 3/22 |
| 9,893,500 | B2 | 2/2018 | Oehring et al. | |
| 11,313,359 | B2 | 4/2022 | Buckley et al. | |
| 2004/0207348 | A1 * | 10/2004 | Wilton | B60L 3/102 318/268 |
| 2009/0092510 | A1 | 4/2009 | Williams et al. | |
| 2015/0001161 | A1 | 1/2015 | Wiemers et al. | |
| 2015/0104287 | A1 | 4/2015 | Ryan | |
| 2015/0275891 | A1 | 10/2015 | Chong | |
| 2016/0098051 | A1 * | 4/2016 | Enyedy | H02J 7/1492 307/52 |
| 2016/0161188 | A1 | 6/2016 | Chong et al. | |
| 2016/0273328 | A1 | 9/2016 | Oehring | |
| 2016/0290114 | A1 * | 10/2016 | Oehring | E21B 43/2607 |
| 2017/0201141 | A1 | 7/2017 | Rollins et al. | |
| 2018/0328157 | A1 | 11/2018 | Bishop | |
| 2019/0154020 | A1 | 5/2019 | Glass | |
| 2019/0309583 | A1 | 10/2019 | Netecke | |
| 2020/0095848 | A1 * | 3/2020 | Rouse | F04B 17/03 |
| 2020/0109616 | A1 | 4/2020 | Oehring et al. | |
| 2020/0109617 | A1 | 4/2020 | Oehring et al. | |
| 2020/0263528 | A1 | 8/2020 | Fischer et al. | |
| 2020/0325760 | A1 | 10/2020 | Markham | |
| 2020/0378232 | A1 | 12/2020 | Sharp et al. | |
| 2021/0102451 | A1 * | 4/2021 | Robinson | E21B 43/17 |
| 2021/0131248 | A1 * | 5/2021 | Hinderliter | E21B 43/26 |
| 2021/0131411 | A1 | 5/2021 | Oehring et al. | |

* cited by examiner

FRACTURING PUMPS

CROSS-REFERENCE TO RELATED APPLICATIONS

This application is a nonprovisional application which claims priority from U.S. provisional application No. 63/042,055, filed Jun. 22, 2020, which is hereby incorporated by reference herein in its entirety.

TECHNICAL FIELD/FIELD OF THE DISCLOSURE

The present disclosure relates to wellsite equipment, specifically to wellsite equipment used for hydraulic fracturing.

BACKGROUND OF THE DISCLOSURE

Hydraulic fracturing, referred to herein as fracking, is a method used to enhance hydrocarbon recovery from certain downhole formations. Fracking involves the injection of high-pressure fluid into the downhole formation to induce fracturing of the formation. A proppant is typically included in the fluid used for fracturing. The proppant enters the fractures and retards the closure of the fractures once the fracking operation is completed. The fractures produced may provide additional flow channels for hydrocarbons to escape the formation.

Multiple pieces of wellsite equipment are used during a fracking operation including pumps used to supply the fracturing fluid to the formation, referred to herein as frac pumps. Frac pumps are typically driven by diesel motors. Frac pumps require the use of multiple other pieces of wellsite equipment to function, each of which must be operatively coupled in order to undertake a fracking operation. Certain of these other pieces of wellsite equipment are hydraulically driven.

SUMMARY

The present disclosure provides for a frac system. The frac system includes an engine, the engine having a crankshaft and a radiator. The radiator includes a radiator cooling fan. The frac system also includes a transmission coupled to the engine and a frac pump coupled to the transmission, the frac pump including a frac pump lubricating oil pump. The frac system further includes a traction drive motor system. The traction drive motor system includes a first set of traction drive motors, the first set of traction drive motors mechanically connected to the crankshaft. The traction drive motor system also includes a second set of traction drive motors, the second set of traction drive motors mechanically connected to the radiator cooling fan. In addition, the traction drive motor system includes third set of traction drive motors, the third set of traction drive motors mechanically connected to the frac pump lubricating oil pump.

The disclosure also includes a method. The method includes providing an engine, the engine having a crankshaft and a radiator. The radiator has a radiator fan. The method also includes mechanically connecting a first set of traction drive motors to the crankshaft and generating electrical power using the first set of traction drive motors. In addition, the method includes electrically connecting a second set of traction drive motors to the first set of traction drive motors and operating the radiator fan using the second set of traction drive motors.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
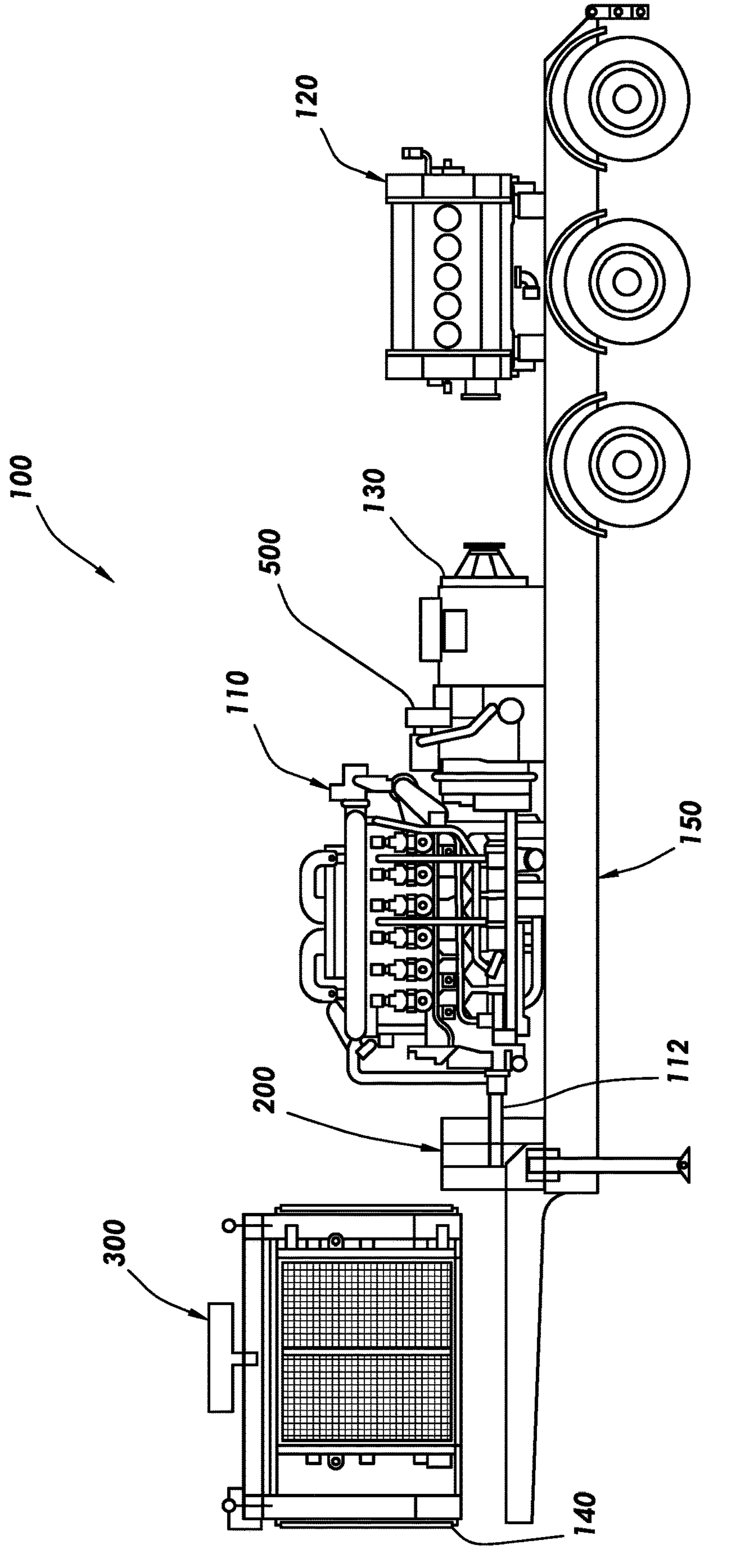
FIG. 1 depicts a side view of frac pump system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
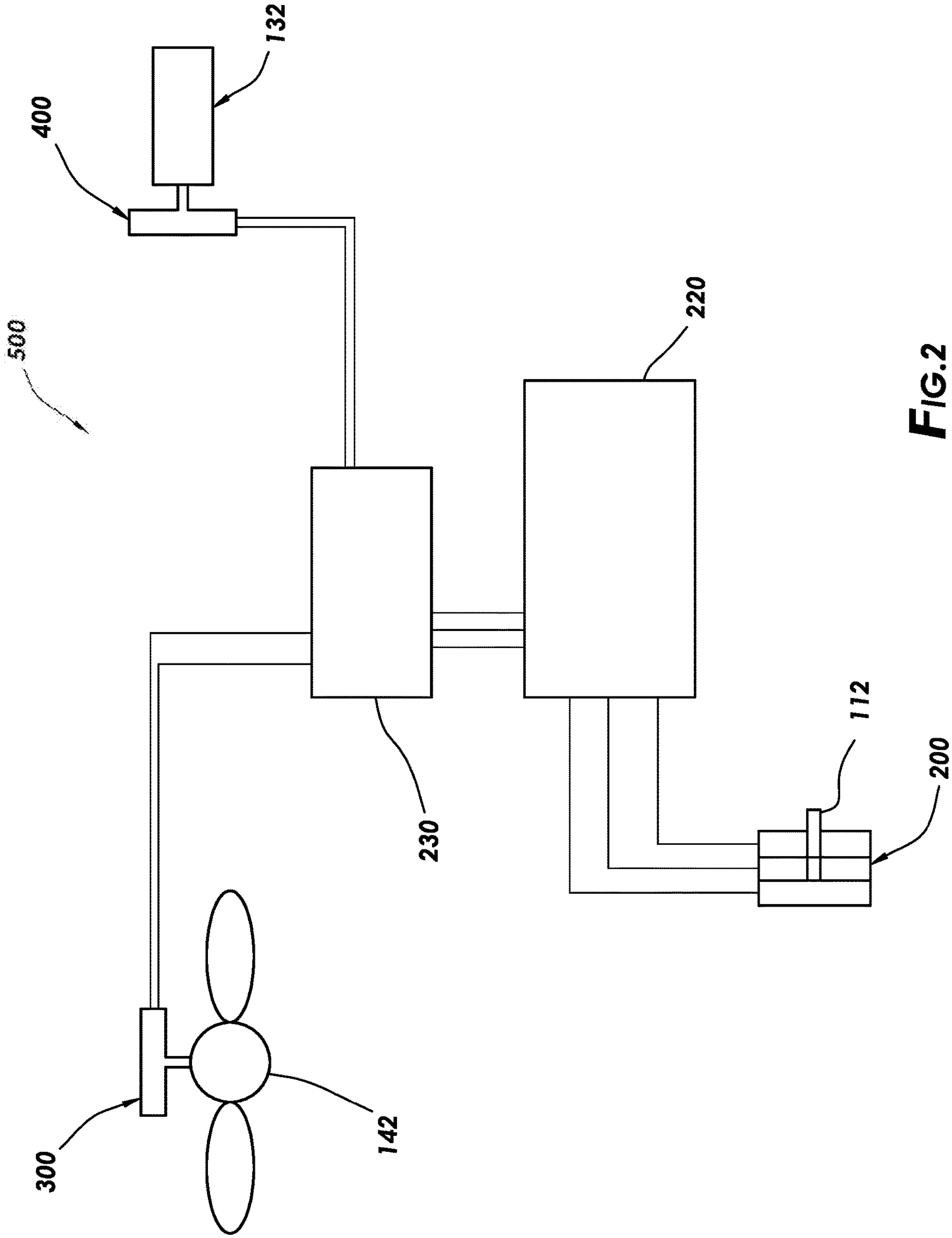
FIG. 2 depicts a schematic view of a traction drive system consistent with at least one embodiment of the present disclosure.

FIG. 1 depicts frac system 100. Frac system 100 may include engine 110. Engine 110 may be a diesel engine in certain embodiments. Engine 110 includes crankshaft 112. Engine 110 may drive frac pump 120 through transmission 130. Engine 110 may be equipped with radiator 140. In certain embodiments, radiator 140 may include radiator cooling fan 142, as shown in FIG. 2. In certain embodiments, frac system 100 may include trailer 150 upon which engine 110, frac pump 120 transmission 130, and radiator 140 may be mounted. In other embodiments, engine 110, frac pump 120, transmission 130, and radiator 140 may be mounted on a skid. Frac system 100 further includes traction drive motor system 500.

FIG. 2 depicts traction drive motor system 500. Traction drive motor system 500 may include first set of traction drive motors 200, second set of traction drive motor 300, and third set of traction drive motor 400. In some embodiments, first set of traction drive motors 200 may be mechanically connected to crankshaft 112 of engine 110. First set of traction drive motors 200 may operate as electrical power generators. Second set of traction drive motors 300 may be used to drive radiator cooling fan 142 from electrical power generated by first set of traction drive motors 200. Third set of traction drive motors 400 may be used to drive frac pump lubricating oil pump 132. A "set" as used herein may include one or more traction drive motors.

As shown in FIG. 2, first set of traction drive motors 200 may be in electrical communication with power storage system 220. Power storage system 220 may include batteries or other electrical storage devices. In certain embodiments, power storage system 220 may be omitted. Power storage system 220 is used to maintain a power reservoir between first set of traction drive motors 200 and second set of traction drive motors 300, third set of traction drive motors 400 and electric motor controls 230. Power storage system 220 may be in data and electrical communication with electric motor controls 230. Electric motor controls 230 may control the speed of second set of traction drive motors 300 and third set of traction drive motors 400.

In certain embodiments, it may be desirable to operate frac pump lubricating oil pump 132 so as to provide a controlled flow of lubricating oil to frac pump 120. In traditional systems, the speed of frac pump lubricating oil pump 132 is determined by the RPMs of engine 110. Thus, as engine speed of engine 110 is altered, for example, due to power demand, the speed of frac pump lubricating oil pump 132 is altered and more or less lubricating oil is supplied to frac pump 120. By contrast, traction drive motor system 500 may supply a controlled flow of lubricating oil to frac pump 120. The controlled flow may be a constant flow or may depend upon the operating needs of frac pump 120.

Traditionally, the power to drive frac pump lubricating oil pump 132 and radiator cooling fan 142 has been through hydraulic power. Hydraulic power components are high maintenance components and often have a short life. The present disclosure describes frac system 100 and traction drive motor system 500 that have a longer life and are less prone to maintenance issues.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A frac system comprising:

an engine, the engine having a crankshaft and a radiator, the radiator including a radiator cooling fan;

a transmission coupled to the engine;

a frac pump coupled to the transmission, the frac pump including a frac pump lubricating oil pump; and a traction drive motor system, the traction drive motor system including:

a first set of traction drive motors, the first set of traction drive motors mechanically connected to the crankshaft;

a second set of traction drive motors, the second set of traction drive motors mechanically connected to the radiator cooling fan; and a third set of traction drive motors, the third set of traction drive motors mechanically connected to the frac pump lubricating oil pump;

wherein the first set of traction drive motors are in electrical communication with a power storage system, the power storage system is in electrical communication with electric motor controls; and wherein the second set of traction drive motors and the third set of traction drive motors are in electrical and data communication with the electric motor controls.

2. The frac system of claim 1, wherein the power storage system comprises batteries.

3. The frac system of claim 1, wherein the engine, frac pump, transmission, and radiator are mounted on a trailer.

4. A method comprising:

providing an engine, the engine having a crankshaft and a radiator, the radiator having a radiator fan;

mechanically connecting a first set of traction drive motors to the crankshaft;

generating electrical power using the first set of traction drive motors;

electrically connecting a second set of traction drive motors to the first set of traction drive motors;

operating the radiator fan using the second set of traction drive motors;

supplying a third set of traction drive motors, the third set of traction drive motors in electrical communication with the first set of traction drive motors and operating a frac pump lubricating oil pump with the third set of traction motors;

providing a power storage system, the power storage system in electrical communication with the first, second, and third set of traction drive motors; and providing motor controls, the motor controls in data communication with the second and third set of traction drive motors.

5. The method of claim 4, wherein the first set of traction drive motors are electrical power generators.

6. The method of claim 5 further comprising controlling a rate of flow of lubrication oil by the frac pump lubricating oil pump using the motor controls.

7. The method of claim 6, wherein the rate of flow of lubrication oil is determined by the requirements of a frac pump.

8. The method of claim 6, wherein the rate of flow of lubrication oil is constant.

* * * * *